United States Patent [19]

Birkert et al.

[11] Patent Number: 5,044,263
[45] Date of Patent: Sep. 3, 1991

[54] ELECTRICALLY HEATED TOASTER

[75] Inventors: Karl Birkert, Steinbach; Heinz Marburger, Frankfurt am Main; Günter R. Kullik, Meinerzhagen, all of Fed. Rep. of Germany

[73] Assignee: Rowenta-Werke GmbH, Offenbach am Main, Fed. Rep. of Germany

[21] Appl. No.: 427,848

[22] PCT Filed: Feb. 3, 1989

[86] PCT No.: PCT/DE89/00066
§ 371 Date: Nov. 3, 1989
§ 102(e) Date: Nov. 3, 1989

[87] PCT Pub. No.: WO89/06927
PCT Pub. Date: Aug. 10, 1989

[30] Foreign Application Priority Data

Feb. 6, 1988 [DE] Fed. Rep. of Germany ....... 3803571

[51] Int. Cl.$^5$ .............. A47J 27/00; A47J 37/08; H05B 1/00; H05B 1/02
[52] U.S. Cl. .................. 99/327; 99/329 RT; 99/335; 99/385; 219/492; 219/502
[58] Field of Search ............ 99/326, 327, 329 R, 99/329 P, 329 RT, 334, 335, 385, 389, 390, 391, 393; 219/413, 492, 494, 497, 502, 505

[56] References Cited

U.S. PATENT DOCUMENTS

| | | | |
|---|---|---|---|
| 3,869,970 | 3/1975 | Eagle | 99/329 R |
| 3,956,978 | 5/1976 | Borley | 219/502 |
| 4,170,932 | 10/1979 | Lalancette | 219/494 |
| 4,213,033 | 7/1980 | Bjarsch | 99/385 |
| 4,222,037 | 9/1980 | Schaap et al. | 340/309.4 |
| 4,395,621 | 7/1983 | Parker | 99/329 P |
| 4,510,376 | 4/1985 | Schneider | 99/327 |
| 4,645,909 | 2/1987 | Thoben et al. | 219/411 |
| 4,755,656 | 7/1988 | Charlesworth et al. | 99/327 |

FOREIGN PATENT DOCUMENTS

| | | |
|---|---|---|
| 0086624 | 8/1983 | European Pat. Off. . |
| 2632500 | 1/1978 | Fed. Rep. of Germany . |
| 3020779 | 12/1981 | Fed. Rep. of Germany . |
| 2718124 | 2/1982 | Fed. Rep. of Germany . |

*Primary Examiner*—Timothy F. Simone
*Attorney, Agent, or Firm*—Toren, McGeady & Associates

[57] ABSTRACT

An electrically heatable toaster includes at least one bread holder which is held in toasting position by an electromagnet. The electromagnet has a tripping device which is actuated manually as well as electrically by a timing control. The timing control includes a clock pulse actuated counting circuit connected to a frequency-determining charging capacitor and a voltage divider. The voltage divider includes a temperature-dependent resistor for compensating the influence of the toasting degree temperature and for triggering the electromagnet tripping device after a preset degree of toasting is reached. An oscillator with two complementary transistors combined in a programmable unijunction transistor circuit operates the counting circuit. The transistors are connected on the input side to a charging current circuit of the frequency determining capacitor and on the output side through a dividing point of the voltage divider with the temperature-dependent resistance to a clock input of the counting circuit. The counting circuit switches a switch in the current circuit of the electromagnet. The electromagnet is in effective connection with an actuating lever for actuating the bread holder.

8 Claims, 2 Drawing Sheets

ELECTRICALLY HEATED TOASTER

BACKGROUND OF THE INVENTION

1. Field of the Invention

The invention is directed to an electrically heated toaster with at least one bread holder which is maintained in toasting position by an electromagnet, which can be tripped manually as well as electrically by a timer, which includes a clock pulse controlled counting stage, which is in circuit connection with a frequency determining charging capacitor, which can be charged through a potentiometer for presetting the degree of toasting, as well as being in circuit connection with a voltage divider, which includes a temperature-dependent resistance for compensation of the influence of the toasting area temperature, with the counting stage triggering the electromagnetic tripping device when the preset degree of toasting has been reached.

2. Description of the Related Art

A toaster with such a tripping device has become known from the German patent publication 30 20 779 C2. The bread holder is put into a toasting position by a switching lever counter to the force of a spring and it is locked in this position by an electromagnetic pawl. At the same time the heating resistances and an electronic time control are switched on, which, after the preset degree of toasting has been reached, operates a switch in the circuit with due regard to the temperature in the toasting space, in order to release the latch or lock between the bread holder which has been lowered into its operating position, and the chassis. If necessary, this lock or latch can also be released manually. After the latch has been released the current supply of the time control and the heating coil is also switched off.

This combined known tripping device, which can be actuated directly by hand through a switching or actuating lever as well as by an electromagnet through an adjustable timer, has disadvantages as far as its electronics as well as the mechanical structure are concerned.

A comparator is provided in the control circuit, at one of whose inputs a series circuit consisting of a potentiometer for presetting the degree of toasting and a frequency determining charging condenser is connected and at whose other input a voltage divider is connected, which includes a temperature-dependent resistance which is affected by the temperature in the toasting space. A counting pulse is given to a counting stage when the voltages at both inputs to the comparator are equal. The counting stage counts up to a specific sum, stretches the counting pulses in between and operates a switch in the current circuit of the electromagnet.

A simple unijunction transistor is to be used as a comparator. However, the known comparator circuit cannot be realized with this alone. Rather a programmed unijunction transistor has to be utilized, which is sensitive to the temperature fluctuations which can never be completely avoided in a toaster, the more so since the condition has to be observed, that only equal input voltages at the inputs are to trigger a counting pulse.

The feed voltage for the known time control is supplied by a rectifier, which is connected through a series resistance directly to the electric mains thus causing considerable losses. Apart from the unnecessary power loss in the series resistance measures for compensating voltage fluctuations must be taken.

In addition, a rapid and complete discharge of the frequency determining capacitor after its having emitted a counting pulse is not assured in the known control circuit. An inaccurately meaning not completely discharged charging condenser leads however necessarily to frequency oscillations and thus to an arbitrary triggering of the electromagnet.

An additional reset switch must be provided in order to reset the counting stage in the known timer.

All in all the known electronic timing control does not assure the precision expected from a domestic appliance in the long run, the more so since one operates with a pulse generation stage in connection with a counting stage. It must be added that the known triggering device includes an electromagnetic pawl, which is released by the electromagnet. In case of current failure the bread carrier thus remains in its latched position and the mains switch cannot be opened.

SUMMARY OF THE PRESENT INVENTION

The invention is based upon the task of simplifying the electronic timing control of a combined triggering device of the type under discussion and at the same time to make it more accurate or precise, as well as also making its mechanical construction easier to operate.

It was seen that these tasks can be solved in a simple manner by using an oscillator, comprising two complementary transistors combined in a programmable unidirectional transistor circuit, for operating the counting stage, which oscillator is connected at its input side to the charging current circuit of the frequency determining capacitor and on its output side through the dividing point of the voltage divider with the temperature-dependent resistance to the clock input of a counting stage operating a switch in the current circuit of the electromagnet which is in effective connection with the switching or actuating lever, and that the electromagnet cooperates with a pick-up anchor, which sits on one end of a twin-armed snap-in pawl pivotably supported at the bread holder, with the pivoting end of which snap-in pawl being in effective connection with the switching lever of the bread holder.

By using a programmable unijunction transmitter circuit for operating the counting stage and by connecting the combined complementary transistors forming the oscillator on the one side to the charging current circuit of the frequency determining charging capacitor and on the other side to the voltage divider with the negative temperature coefficient resistance, a bridge circuit is realized in the programmable unijunction transistor region; the "left" side of this bridge consists of the potentiometer for presetting the degree of toasting and of the frequency determining charging capacitor, and the "right" side consists of a combination of resistances, which includes the temperature-dependent resistance. Because of this arrangement the relationships, which in the last analysis constitute the counting frequency, remain always equal in the course of possible voltage fluctuations within the DC current supply of the timing control. For this reason the circuit in the invention can largely do without means for the smoothing and regulation of the supply voltage.

It is also advantageous that the original voltage for the current supply of the electronics is not picked up, as is the case in the known circuit, through a specific series resistance directly from the electrical mains, rather it is picked up from a voltage divider of the heating resistance proper.

Because of the so-called valley point current, through which the programmable unidirectional transistor circuit passes when it emits a counter pulse, the valley point voltage also drops to a lower point, which ensures that the frequency determining charging condenser is discharged down to a lowest point prior to each additional charging process.

In the invention one can do without a special reset switch for the counting stage. The reset function of the counting stage is automatically produced by a resistance-capacitance combination when the voltage is applied.

It is furthermore advantageous that the electromagnet cooperates with a pick-up anchor, which sits at a snap-in pawl. Hereby one achieves on the one hand, that the bread holder always moves into its neutral position of rest in case of current failure and on the other hand that the electric mains switch is also opened. It must be added that, if the triggering device is operated manually, the pick-up anchor is not pulled off the electromagnet, rather it is "wiped off" from said electromagnet which is favorable for the operation of the device.

In the following an embodiment example of the invention is explained with the help of the drawing.

BRIEF DESCRIPTION OF THE DRAWING

It is shown on.

DESCRIPTION OF THE PREFERRED EMBODIMENTS

Figure 1:
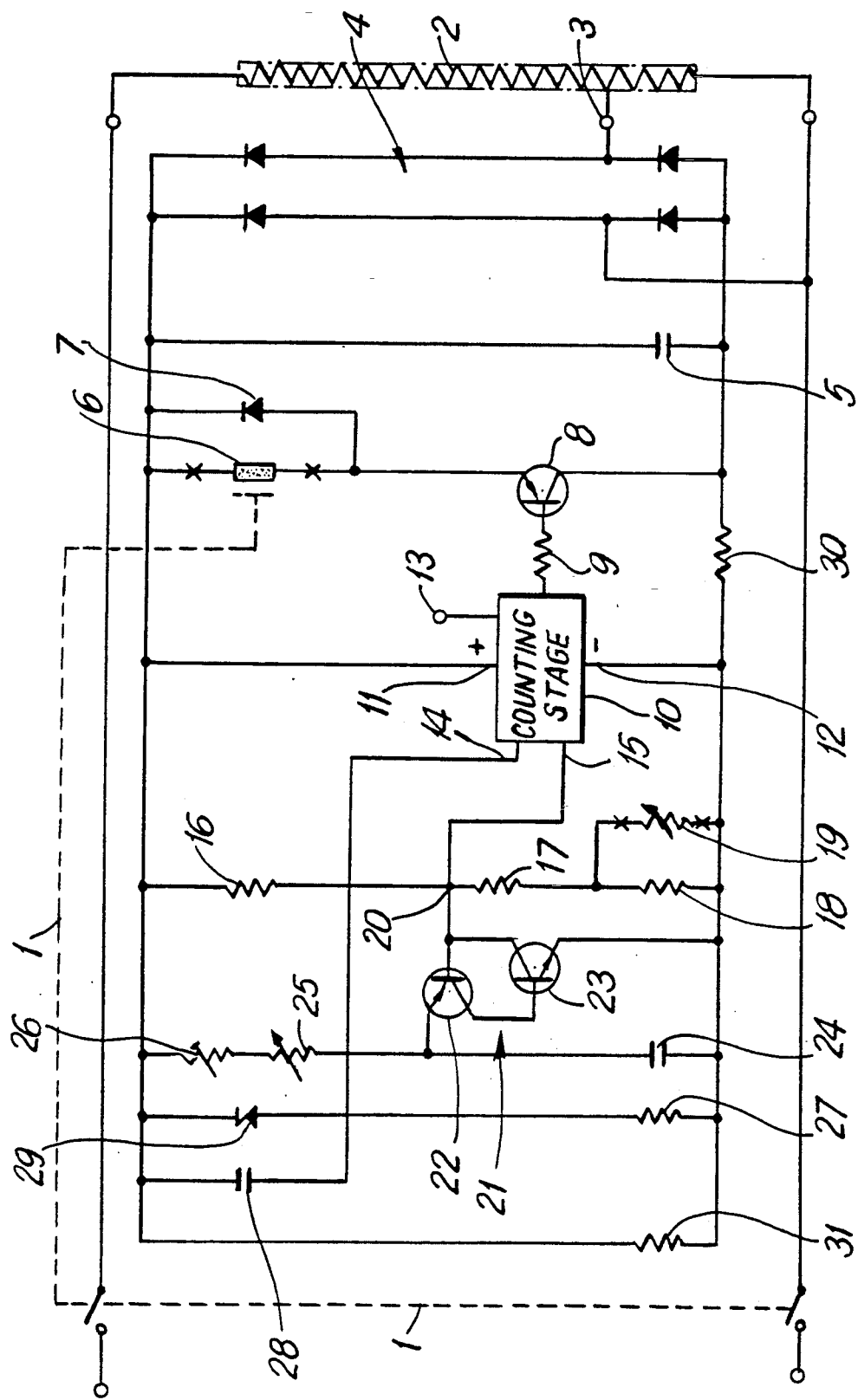
FIG. 1 a circuit diagram of the electronic timing control.

According to FIG. 1 the non-designated terminals depicted on the left-hand side are connected to the electrical mains. The main switch 1 outlined only diagrammatically is designed as a two-pole rotary switch and is in mechanical operative connection in a manner known as such with an electromagnet 6.

The current carrying lines behind the two-pole rotary switch lead through non-designated flat prong plugs to the heating resistor 2.

The depicted heating resistance 2 constitutes a voltage divider with a branch-off 3 to the rectifier 4. Relative to the lower terminal of the heating member 2 in FIG. 1, $V_{eff}$ is tapped at 15. Because of this tapping of the supply voltage for the electronic timing circuit the terminals of the heating member 2 cannot be interchanged during assembly and repair. The branch-off 3 is connected to a diode rectifier 4 whose other side is connected with the lower supply line in FIG. 1. Special measures for regulation and smoothing of the DC voltage supplied by the rectifier 4 are not required as will be explained later in detail. In spite of that a smoothing capacitor 5 can be included.

An electromagnet 6 is connected to the DC current supply, with a free-wheeling diode 7 being switched in parallel thereto and in whose circuit a switching transistor 8 is placed. The base of the switching transistor 8 is connected through a resistance 9 to a counting or circuit 10. This counting stage 10 is connected to the positive line of the current supply through a voltage feed terminal 11 and to the negative line of the current supply through the voltage feed terminal 12. 13 designates a testing point for the counting stage.

The counting stage 10 comprises a reset input 14 and a clock input 15. The event to be counted is generated in an oscillator 21 which operates a sawtooth or relaxation type oscillator. It consists of the two transistors 22 and 23 connected in series of which transistor 22 is designated as input transistor. The series combination of complementary transistors is designated as a programmable unijunction transistor circuit.

The emitter of the input transistor 22 is connected to the charging current circuit of the frequency determining charging capacitor 24. A setup potentiometer 25 for the degree of toasting and the trimming device 26 are provided in this charging current circuit.

The output of the programmed unijunction transistor circuit is connected to a dividing point 20 of a voltage divider, which consists of resistors 16 and 17 and an NTC-resistance 19. The depicted resistor 18 does not exist in actual fact. The programmable unijunction transistor circuit becomes conductive in an instantaneously sudden manner, when the voltage at the emitter of the input transistor 22 becomes positive with respect to the voltage at the dividing point 20. In a preferred embodiment example of the invention the building block IC 1, N.C. 1-7, 13, 15 is used as counting stage 10.

The reset input 14 of the counting stage 10 is connected to a resistor capacitor combination, which consists of a resistance 27 and a capacitor 28. A Zener diode 29 is shown parallel to the capacitor 28 which is however not normally required. The combination of the resistance 27 and the capacitor 28 forms a so-called "Power-on-Reset"-circuit.

The voltage at the emitter of the input transistor 22 follows the charging of the frequency-determining charging capacitor 24. The charging time is selected by the operator through the setup potentiometer 25 for the degree of toasting. The smallest time setup is adjusted in the trimmer 26 during manufacture of the electronics.

A resistor 30 is provided in the negative feed line of the DC voltage supply and is arranged in such a way that together with the circuit elements 27 and 28 it forms a voltage supply for the programmed unijunction transistor circuit which is lower by 3 volts and smoother.

A resistance 31 discharges the capacitors after each switch-off, especially the capacitor 28 in order to prepare a renewed reset signal in such a way.

Figures 2, 3:
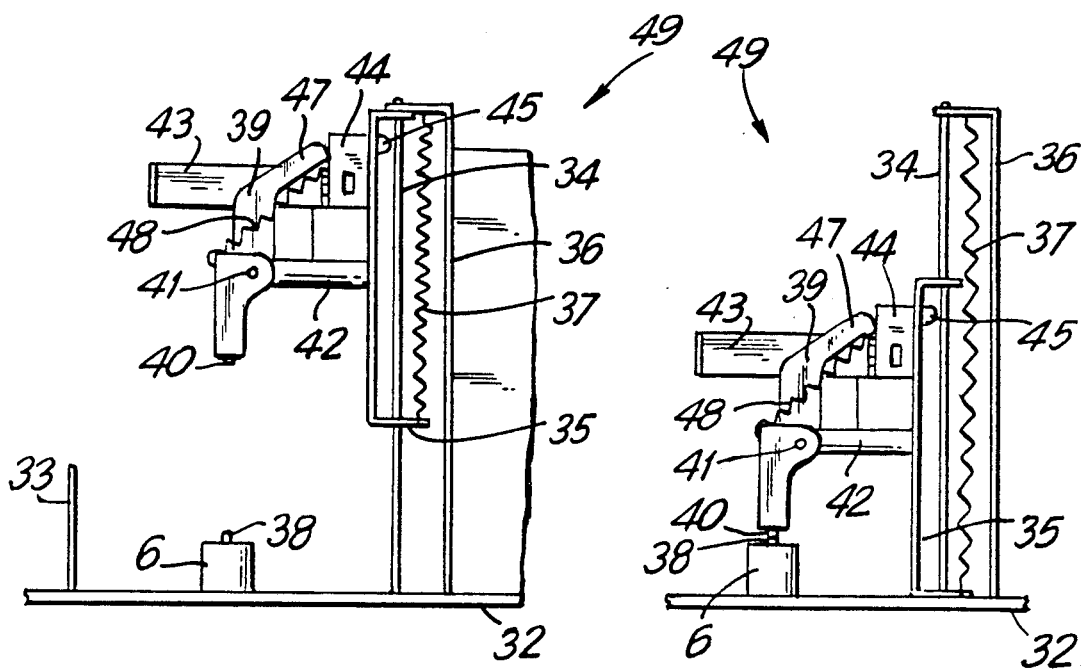
FIG. 2 a diagrammatic view of a combined tripping arrangement in the initial or neutral position of rest, FIG. 3 a diagrammatic view of the combined tripping device in the "in" position, FIG. 4 a diagrammatic arrangement of the tripping device after actuating the manual triggering and FIG. 5 the same situation of the tripping device according to FIG. 4, however when viewed in direction of the arrows V/V in FIG. 4.

FIG. 2 shows on a base plate 32 a printed circuit board 33 with the electronic timing control depicted in FIG. 1, the electromagnet 6 with its anchor 38 as well as a slide or displacement rod 34 on which a bread-holder 35 can move upwards and downwards. A side plate 36 terminating the toasting space is discernible in FIG. 2 but also in FIG. 5. The bread holder 35 is under the action of a spring 37 which is designed as a tension spring and maintains the bread holder normally in its neutral position shown in FIG. 2. A twin-armed snap-in pawl 39 is connected to the bread holder 35 through a support rod 42, which pawl is under the action of a reset spring 48. The snap-in pawl 39 is pivotable around a rotation point 41 at the end of the support rod 42 and is under the effect of a reset spring 48. A pick-up anchor 40 is arranged at the end of the snap-in pawl 39 facing the electromagnet 6.

Figures 4, 5:
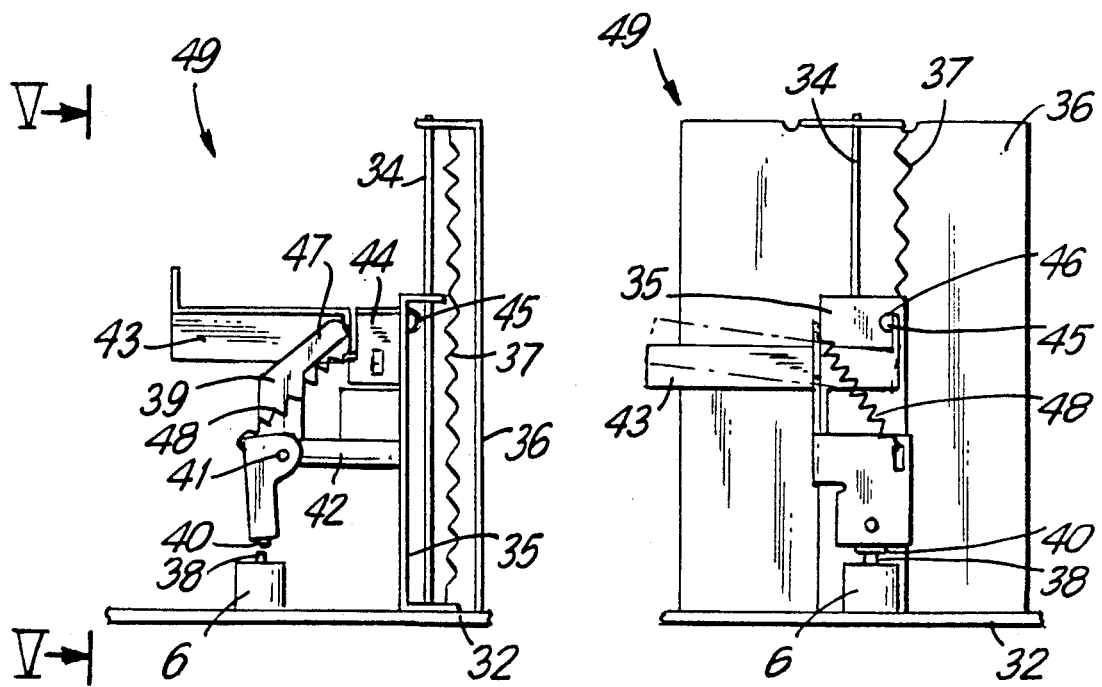

A switching or actuating lever 43 is connected to the bread holder 35 which has a switching extension 44 with a switching lug 45 at its end facing the bread holder 35, which switching lug 45 can be pivoted in a pivot aperture 46. The pivot end 47 of the twin-armed snap-in pawl 39 rests upon the switching lever 43. The arrangement depicted in FIGS. 2 to 4 is the combined tripping device designated with 49.

If the switch 1 of the bread holder is placed in its operative position by the operator, the non-designated switch contacts close, the current for the heating resistor 2 and the DC current supply for the timing control are switched on and the bread holder is retained in its lower position counter to the force of the spring 37 by the cooperation of the anchor 38 of the electromagnet with the pick-up anchor 40 at the snap-in pawl 39. The counting stage 10 is first connected to the voltage by the resistor 30 and subsequently the reset input 14 is also connected to the voltage by the action of resistor capacitor combination 27, 28.

The required reset state is produced thereby automatically at the reset input 14. All counting stages of the counting stage 10 ar set to zero and the output to the resistance 9 is also imparted a zero potential. This causes a current flow in the base of the switching transistor 8, so that current now flows through the electromagnet 6.

The charging of the charging condenser 24 now starts through the setup or adjustment potentiometer 25 for the degree of toasting. The shortest charging time is present if the setup potentiometer 25 is set to zero and now only the trimmer 26 is in the circuit and effective.

The charging of the charging condenser 24 follows an exponential function until the voltage at the emitter of the input transistor 22 is higher than the voltage at the dividing point 20 of the voltage divider 15, 17, 19.

At this point in time the programmable unijunction transmitter circuit becomes instantaneously and suddenly conductive. The charging condenser 24 is steeply discharged and a current lower than the valley point current of the programmable unijunction transistor circuit now flows. Both transistors 22 and 23 revert to the non-conductive state. At the dividing point 20 a counting pulse is generated which sets the first counting stage of the counting stage 10. The voltage at the dividing point 20 depends on the temperature at the NTC-resistance 19. It diminishes if the negative temperature coefficient resistor becomes warmer.

An additional counting pulse is generated if the charging condenser 24 is again charged. An additional counting step is set up.

In a preferred embodiment example of the invention, the counting stage is balanced in such a way that after 256 pulses at the output the switching transistor 8 is blocked through the resistance 9. The electromagnet 6 drops off and the entire switching circuit is discharged through the resistance 31. The bread holder 35 returns to its initial top position in FIG. 2 under the action of the spring 37.

A manual triggering of the combined tripping device 49 occurs, if the switching lever 43 is pivoted as can be discerned in FIGS. 4 and 5. Herein the snap-in pawl 39 pivots counterclockwise around the center of rotation 31, so that the pick-up anchor 40 is so-to-say "wiped off" from the anchor 38 of the electromagnet 6 which is still under voltage. Because of the direct contacting of the pick-up anchor 40 and the anchor 38 of the electromagnet and by the operationally favorable separation of the pick-up anchor 40 from the anchor 38 considerable handling comfort is achieved.

We claim:

1. Electrically heatable toaster comprising at least one bread holder movable into a toasting position, the bread holder being held in toasting position by an electromagnet, a tripping device for the electromagnet, the tripping device being actuated manually as well as electrically by a timing control, the timing control including a clock pulse actuated counting circuit the counting circuit being in connection with a frequency-determining charging capacitor chargeable for presetting the degree of toasting as well as a voltage divider, the voltage divider including a temperature-dependent resistor for compensating the influence of the toasting degree temperature and for triggering the electromagnet tripping device after a preset degree of toasting is reached, an oscillator with two complementary transistors (22, 23) combined in a programmable unijunction transistor circuit for operating the counting circuit (10), the transistors being connected on the input side to a charging current circuit of the frequency determining capacitor (24) and on the output side through a dividing point (20) of the voltage divider (16, 17, 19) with the temperature-dependent resistance (19) to a clock input (15) of the counting circuit (10) which switches a switch (8) in the current circuit of the electromagnet (6), the electromagnet being in effective connection with an actuating lever (43) for actuating the bread holder.

2. Timing control for an electromagnetic tripping device in claim 1, wherein the temperature-dependent resistance is a negative temperature coefficient resistor (19).

3. Timing control according to claims 1 or 2, wherein the charging current circuit (25, 26) for the frequency-dependent capacitor (24) and the voltage divider (16, 17, 19) with the NTC-resistance (19) are connected to the terminals of the DC current supply which is connected to a heating resistor (2) through a rectifier (4) with a branch-off (3).

4. Timing control according to claims 1 or 2, characterized in that the reset input (14) of the counting circuit (10) is connected to the DC current supply through a resistor-capacitor combination (27, 29).

5. Manually actuatable portion of the combined tripping device in claim 1, wherein the electromagnet (6) coacts with a pickup anchor (40) located at an end of a twin-armed snap-in pawl (39) pivotable (41) supported at the bread holder (35) a pivoting end (47) of the plant (39) being in effective connection with the actuating lever (43) for the bread holder (35).

6. Manually actuatable portion of the combined tripping device in claim 5, wherein the actuating lever (43) is supported at the bread holder (35) so as to be pivotable upwards in a pivoting plane which is perpendicular to the pivoting plane of the snap-in pawl (39) and said switching lever (43) is subjected to the action of a spring (37).

7. Manually actuatable portion of the combined tripping device according to claims 5 or 6, wherein a switching extension (44) with a switching lug (45) is seated at an end of the actuating lever (43) facing the bread holder (35), and wherein the switching lug (45) projects into a pivoting aperture (46) at the bread holder (35).

8. Manually actuatable portion of the combined tripping device according to claims 5 or 6. comprising a reset spring (48) designed as a tension spring which is stressed between the switching lever (43) and the snap-in pawl (39), such that both remain in operating position.

* * * * *